(12) United States Patent
Kaiser (10) Patent No.: US 10,837,678 B1
(45) Date of Patent: Nov. 17, 2020

(54) GEOTHERMAL ADAPTER FOR USE WITH A HEAT PUMP AND ASSOCIATED METHODS

(71) Applicant: Commercial Energy Saving Plus, LLC, Boca Raton, FL (US)

(72) Inventor: Stewart Kaiser, Palm Beach Gardens, FL (US)

(73) Assignee: COMMERCIAL ENERGY SAVINGS PLUS, LLC, Boca Raton, FL (US)

( * ) Notice: Subject to any disclaimer, the term of this patent is extended or adjusted under 35 U.S.C. 154(b) by 0 days.

(21) Appl. No.: 16/983,365

(22) Filed: Aug. 3, 2020

(51) Int. Cl.
*F24T 10/10* (2018.01)
*F25B 30/06* (2006.01)
*F25B 47/02* (2006.01)
*F24F 5/00* (2006.01)

(52) U.S. Cl.
CPC ............. *F24T 10/10* (2018.05); *F25B 30/06* (2013.01); *F25B 47/025* (2013.01); *F24F 5/0046* (2013.01); *F24F 2005/0057* (2013.01); *F25B 2313/002* (2013.01); *Y02B 10/40* (2013.01)

(58) Field of Classification Search
CPC ........ F24T 10/10; F25B 30/06; F25B 47/025; F25B 2313/002; F24F 5/0046; F24F 2005/0057; F24F 2005/0053; Y02E 10/10; Y02B 10/40; F24D 2200/11
See application file for complete search history.

(56) References Cited

U.S. PATENT DOCUMENTS

| | | | | |
|---|---|---|---|---|
| 5,461,876 A | * | 10/1995 | Dressler | F25B 13/00 62/160 |
| 2008/0271453 A1 | * | 11/2008 | Faget-Mora | F03G 7/04 60/641.3 |
| 2011/0232858 A1 | * | 9/2011 | Hara | F24T 10/17 165/45 |
| 2012/0144829 A1 | * | 6/2012 | Wiggs | F24T 10/30 60/641.2 |
| 2015/0330670 A1 | * | 11/2015 | Wynn, Jr. | F24T 10/00 165/45 |
| 2017/0292792 A1 | * | 10/2017 | Yokomine | F28D 7/16 |

* cited by examiner

*Primary Examiner* — Joseph F Trpsovsky
(74) *Attorney, Agent, or Firm* — Allen Dyer Doppelt & Gilchrist, PA (57) ABSTRACT

A geothermal adapter for use with a heat pump includes an outer chamber being sealed under vacuum and having a plurality of heat sinks extending outward, and an inner chamber positioned concentrically and within the outer chamber. The inner chamber has an outlet configured to be coupled to a first portion of a refrigerant conduit of the heat pump. The geothermal adapter also includes a central chamber positioned concentrically and within the inner chamber, where the central chamber has an inlet configured to be coupled to a second portion of the refrigerant conduit of the heat pump. The center chamber extends through the inner chamber to a bottom end that is open and in fluid communication with the inner chamber.

20 Claims, 7 Drawing Sheets

GEOTHERMAL ADAPTER FOR USE WITH A HEAT PUMP AND ASSOCIATED METHODS

FIELD OF THE INVENTION

The present invention relates to heating and cooling systems, and more particularly, to a geothermal adapter for use with a heat pump and associated methods.

BACKGROUND OF THE INVENTION

The heating and air conditioning industry is a well-established industry and the methods used are well known and documented. The most common method to heat a building utilizes the combustion of fossil fuels. In addition, the most common method used to cool a building is utilizing the refrigeration circuit. This is commonly known as air conditioning.

In an effort to heat and cool a building more efficiently, the industry utilizes a reverse cycle refrigeration circuit known as a heat pump. This method absorbs thermal energy or heat from within a building and transfers it outside for release and then starts the cycle again. This enable the system to cool and dehumidify a building. When the cycle operates in reverse, the system absorbs heat or thermal energy from the outside and releases it inside the building. This method is used to heat a building.

This method of heating is typically more efficient and environmentally friendly than the combustion of fossil fuels which release large amounts of carbon dioxide and other harmful chemicals into the environment. In addition, while the combustion process is typically about ninety eight percent efficient under the perfect conditions, a heat pump or refrigeration cycle operates at a coefficient of performance of three, meaning it operates three times more efficient then the amount of electricity supplied to run the system.

Accordingly, the refrigeration cycle of a heat pump is extremely efficient to cool a building but a drawback is that it is not so efficient when attempting to heat a building in colder climates. During the summer months, there is plenty of thermal energy in the air for the refrigeration cycle to absorb and transfer from one point to another. However, in the winter when there is much less thermal energy in the air, the heat pump must work much harder to absorb the thermal energy which is much less abundant in each square foot of air. When the outdoor temperature drops below forty degrees Fahrenheit a heat pump will still operate at a fairly high efficiency. That is the reason they are used in areas where the winter months are still rather mild. However once the outdoor temperature dips below twenty degrees Fahrenheit, a heat pump begins to struggle to absorb enough thermal energy to efficiently heat a building. After the outdoor temperature drops to the single digits or below zero, a heat pump needs to operate so long and hard attempting to absorb thermal energy from the air, that it becomes much less practical and buildings operate much more efficient utilizing fossil fuel furnaces.

In addition, as the temperature begins to drop from forty degrees Fahrenheit, a heat pump will begin to require a defrost cycle. The defrost cycle is where the heat pump removes frost which builds up on the coils as the temperature of the coils dip down below the outdoor air temperature causing condensation to form on the coils and subsequently frost. Once the frost builds up, the heat pump loses its ability to transfer or absorb heat from the outdoor air. Therefore, it must perform a defrost cycle to remove this frost build up so it may continue to operate. The colder the outdoor air becomes, the more frequent a defrost cycle must be performed. Once the outdoor temperature drops below ten degrees, the defrost cycles become so frequent, using a heat pump to heat a building becomes nearly impossible to do in an efficient manner.

During the defrost cycle, the heat pump reverses its function from the heating cycle to a cooling or air conditioning cycle. This then heats up the outdoor coil, defrosting the tubes, however during this cycle the system uses electric energy to conduct the defrost cycle and produces no heat for the building. Thus, electric element strip heaters inside the air handler or blower section are energized during the defrost cycle to keep heat flowing to the building. This causes an enormous amount of electrical consumption as electric element heating is the costliest form of heat. The defrost cycles make a large impact when calculating the true efficiency ratings of a heat pump system during cold outdoor temperatures even though these defrost cycles only last several minutes. Thus, heat pumps are not the system of choice in colder climates because a heat pump is less efficient to operate as the outdoor temperature decreases and requires more frequent defrost cycles.

In an effort to address these negative aspects of a heat pump in colder environments, a method known as geothermal extraction had been developed. This method or system design describes placing hundreds and thousands of feet of piping hundreds of feet underground, where the natural thermal heat of the earth stays about fifty-five degrees all year long. Usually water is pumped through these pipes to extract the fifty five degree heat from the earth and transfers it into the refrigeration cycle, eliminating the heat pump from attempting to absorb thermal energy from subfreezing outdoor air.

Recently a system has been developed known as DGX or direct geothermal exchange, however this method requires massive excavation and hundreds of feet of pipe being buried hundreds of feet below the surface of the earth. These methods are impractical to most homeowners or commercial businesses as they require massive fields, in most cases larger than a football field and unrealistic expenses, usually over fifty thousand dollars. When comparing the savings versus the expense to install such a system, the pay back seems impractical. Accordingly, there is a need in the art for an improved heat pump system that is efficient and practical for homeowners and businesses to install and operate.

SUMMARY OF THE INVENTION

A geothermal adapter for use with a heat pump is disclosed. The geothermal adapter includes an outer chamber being sealed under vacuum and having a plurality of heat sinks extending outward, and an inner chamber positioned concentrically and within the outer chamber. The inner chamber has an outlet configured to be coupled to a first portion of a refrigerant conduit of the heat pump. The geothermal adapter also includes a central chamber positioned concentrically and within the inner chamber, where the central chamber has an inlet configured to be coupled to a second portion of the refrigerant conduit of the heat pump. The center chamber extends through the inner chamber to a bottom end that is open and in fluid communication with the inner chamber. The geothermal adapter may also include the mineral zeolite surrounding the plurality of heat sinks.

The geothermal adapter is configured to receive refrigerant at a first temperature at the inlet of the central chamber during a heating cycle, and to discharge the refrigerant at a second temperature higher than the first temperature at the outlet of the inner chamber. In addition, the geothermal adapter is configured to receive refrigerant at a first temperature at the inlet of the inner chamber during a cooling cycle, and to discharge the refrigerant at a second temperature lower than the first temperature at the outlet of the central chamber.

In another particular aspect, a heating and cooling system is disclosed. The system includes a heat pump, an air handler, and a geothermal adapter coupled between the heat pump and the air handler and positioned below ground.

In another aspect, a method of operating a heating and cooling system is disclosed, where the system includes a heat pump, an air handler, and a geothermal adapter coupled between the heat pump and the air handler and positioned below ground. The method includes circulating refrigerant between the heat pump, the air handler, and the geothermal adapter. A flow direction of the refrigerant during a heating cycle is from the heat pump to the air handler, to the geothermal adapter, and back to the heat pump. A flow direction of the refrigerant during a cooling cycle is from the heat pump to the geothermal adapter, to the air handler, and back to the heat pump.

DETAILED DESCRIPTION OF PREFERRED EMBODIMENTS

In the summary of the invention, provided above, and in the descriptions of certain preferred embodiments of the invention, reference is made to particular features of the invention, for example, method steps. It is to be understood that the disclosure of the invention in this specification includes all possible combinations of such particular features, regardless of whether a combination is explicitly described. For instance, where a particular feature is disclosed in the context of a particular aspect or embodiment of the invention, that feature can also be used, to the extent possible, in combination with and/or in the context of other particular aspects and embodiments of the invention, and in the invention generally.

It is an objective of the invention to provide an apparatus, method and system in which to further increase the efficiency and operations of a heat pump system even further such as the already highly efficient thermal cell heat pump system described in U.S. patent application Ser. No. 16/423,887 and owned by the same Applicant herein.

Figure 1:
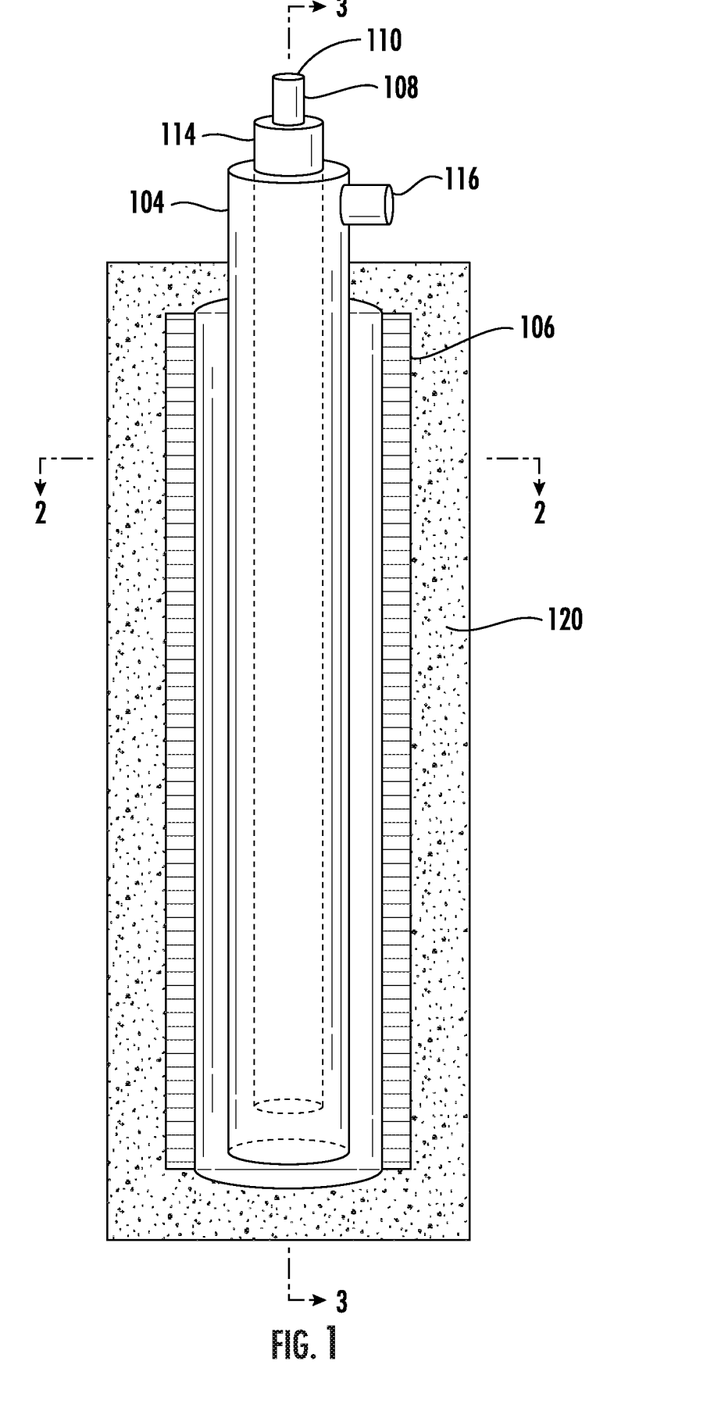
FIG. 1 is a schematic of a geothermal adapter in which various aspects of the disclosure may be implemented.

Now referring to FIG. 1, a geothermal adapter in accordance with the invention is disclosed and generally designated 102. The geothermal adapter 102 can be used as an accessory to the Applicant's thermal cell heat pump system where the geothermal adapter 102 is installed between the heat pump 100 and an indoor air handler of the system. However, those of ordinary skill in the art will recognize that the geothermal adapter 102 can be used with a typical heat pump and is not limited to use with the Applicant's thermal cell heat pump.

The geothermal adapter 102 includes an outer chamber 104, which comprises a plurality of heat sinks 106 extending outward from the outer chamber 104. An inner chamber 114 is generally concentrically and within to the outer chamber 104. A central chamber 108 is similarly concentrically and within to the inner chamber 114. The central chamber 108 comprises an inlet 110 at its top end 110 that is configured to be coupled to a refrigerant conduit of the heat pump 100. The center chamber 108 extends through the inner chamber 114 to a bottom end 112 that is open. The open end 112 of the center chamber 108 is in fluid communication with the inner chamber 114. Those of ordinary skill in the art can appreciate that the inlet 116 of the central chamber would be an outlet during a cooling cycle when the direction of flow of refrigerant from the heat pump 100 is reversed.

Figure 2:
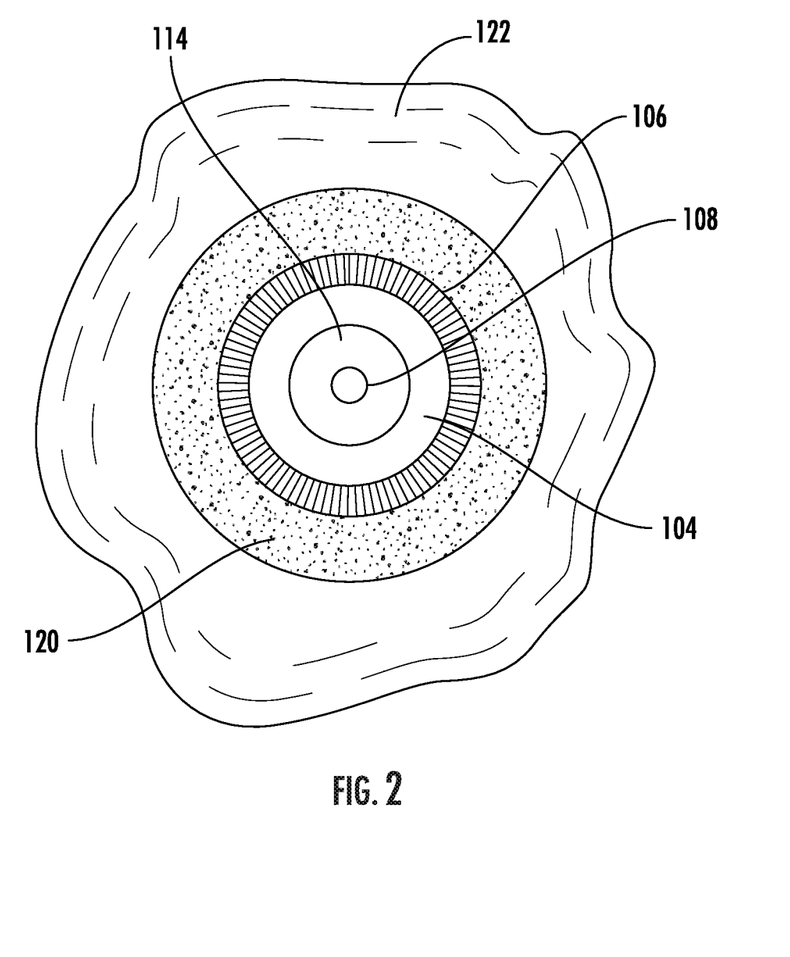
FIG. 2 is a schematic of a cross section of the geothermal adapter taken in the direction of line 2-2 of FIG. 1.
Figure 3:
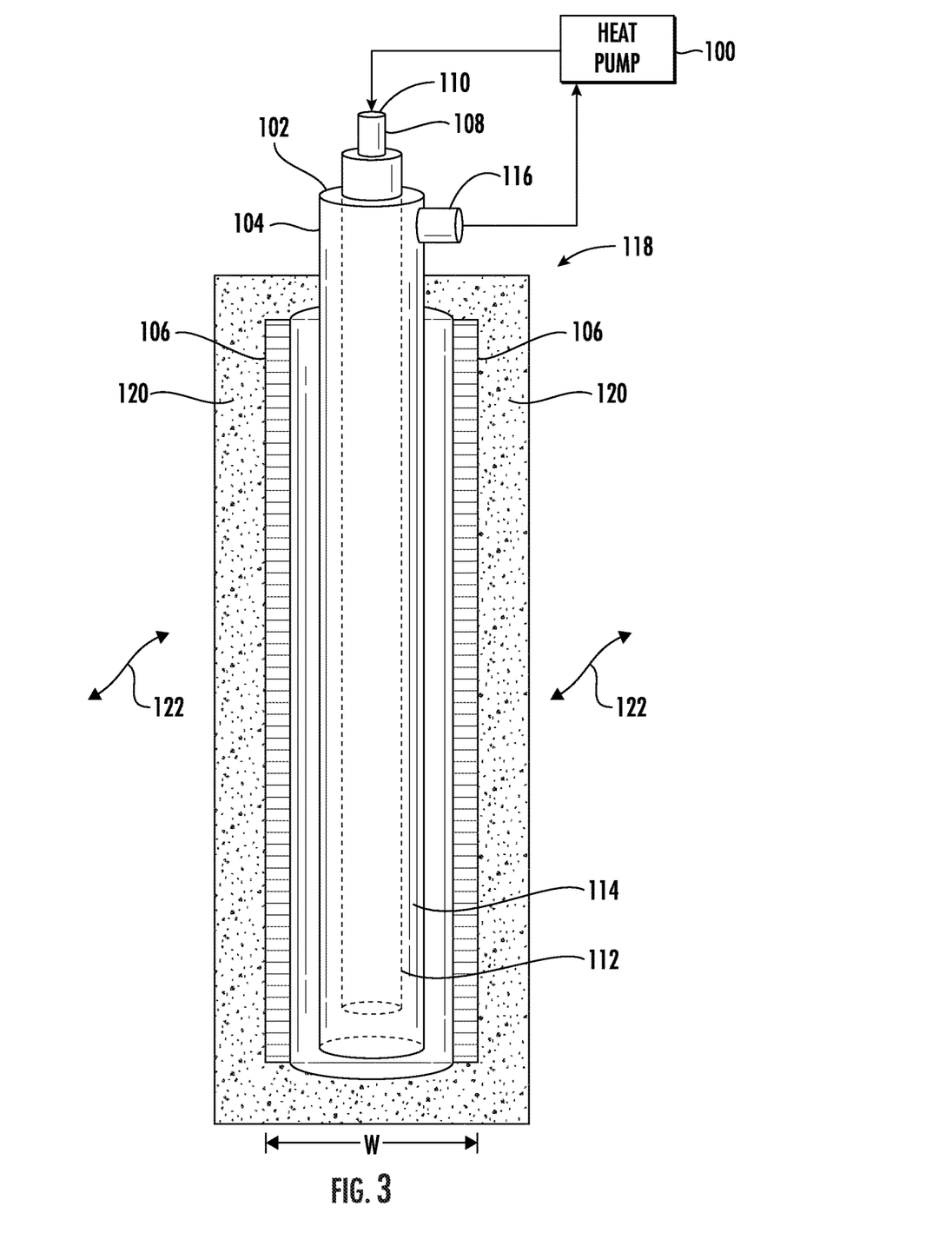
FIG. 3 is a schematic of a cross section of the geothermal adapter taken in the direction of line 3-3 of FIG. 1 and installed in the ground.

A cross sectional view of the geothermal adapter 102 is illustrated in FIGS. 2 and 3 to show its construction. In a particular aspect, the length L of the geothermal adapter 102 may be approximately twelve feet long. The width W of the geothermal adapter 102 may be approximately five inches wide, where the body of copper making up each chamber 104, 108, 114 may comprise ACR or L type copper.

As explained above, the geothermal adapter 102 comprises three chambers in which the outer chamber 104 is constructed of thick wall copper and lined with a plurality of heat sinks 106 for efficient thermal transfer. This outer chamber 104 is also free of air and placed into a vacuum state to eliminate any insulated properties. The plurality of heat sinks 106 may be comprised of aluminum in a particular aspect of the invention.

The inner chamber 114 of the geothermal adapter 102 is configured to discharge the refrigerant through an outlet 116 proximate a top end during a heating cycle. The center chamber 108 is positioned within the inner chamber 114 and includes the inlet 110 positioned at the top of the geothermal adapter 102. Those of ordinary skill in the art can appreciate that the outlet 116 would be an inlet during a cooling cycle when the direction of flow of refrigerant from the heat pump 100 is reversed.

The inner chamber 114 is configured to be a conduit for liquid flowing refrigerant from the heating cycle of the heat pump 100. During the heating cycle, a diameter of the inner chamber 114 allows the refrigerant to flow slower and absorb more geothermal energy from the outer chamber 104. The outer chamber 104 also acts as a protective barrier for the center and inner chambers 108, 114. Accordingly, the outer chamber 104 prevents the refrigerant from escaping the geothermal adapter 102 since the geothermal adapter 102 is hermetically sealed.

The geothermal adapter 102 is configured to utilize natural properties of minerals in order to more efficiently absorb, tap and transfer geothermal energy. For example, the balance of the bore or vacant area surrounding the geothermal adapter 102 within a hole may be filled with zeolite 120. Zeolite 120 is a sponge like mineral that is able to hold four times more heat than water. The zeolite 120 will continue to assist the geothermal adapter 102 to tap, absorb and transfer geothermal energy to the heat pump 100.

The zeolite 120 is configured to adapt to the fifty-five degree ground temperature that is typically found about twenty four inches below the surface 118 and below the freezing depth. Once the geothermal adapter 102 begins to cool as a result of refrigerant flowing through its chambers, the plurality of heat sinks 106 and outer chamber 104 that is comprised of copper will cause condensation on the outside of the geothermal adapter 102. This in turn will cause the zeolite 120 to release thermal heat energy which will then be absorbed by a natural thermal transfer process into the refrigerant flowing through the geothermal adapter 120.

The construction of the geothermal adapter 120 results in efficient thermal transfer properties. For example, the outer, inner, and center chambers 104, 114, 108 are comprised of copper and the plurality of heat sinks 106 are comprised of a different metal, in this example aluminum. In addition, the outer chamber 104 of the geothermal adapter 102 is under a vacuum so that no air is present and therefore no insulating properties or restrictions in the thermal transfer. When the heat pump 100 is in its heating cycle, cold liquid refrigerant will flow from the heat pump 100 into the center chamber 108 and be in its coldest state. The refrigerant then will flow down to the bottom of the center chamber 108 and exit the center chamber 108 at its bottom end 112 and then begin its trip back up into the inner 114 chamber in which it will flow at a slower rate and realize a larger surface interaction. The refrigerant will begin to absorb geothermal heat energy from the ground 122 as heat energy will flow from warmer ground towards the colder geothermal adapter 102. The refrigerant flow circulating through the geothermal adapter 102 and the heat pump may be controlled by a variable speed compressor.

Figure 4:
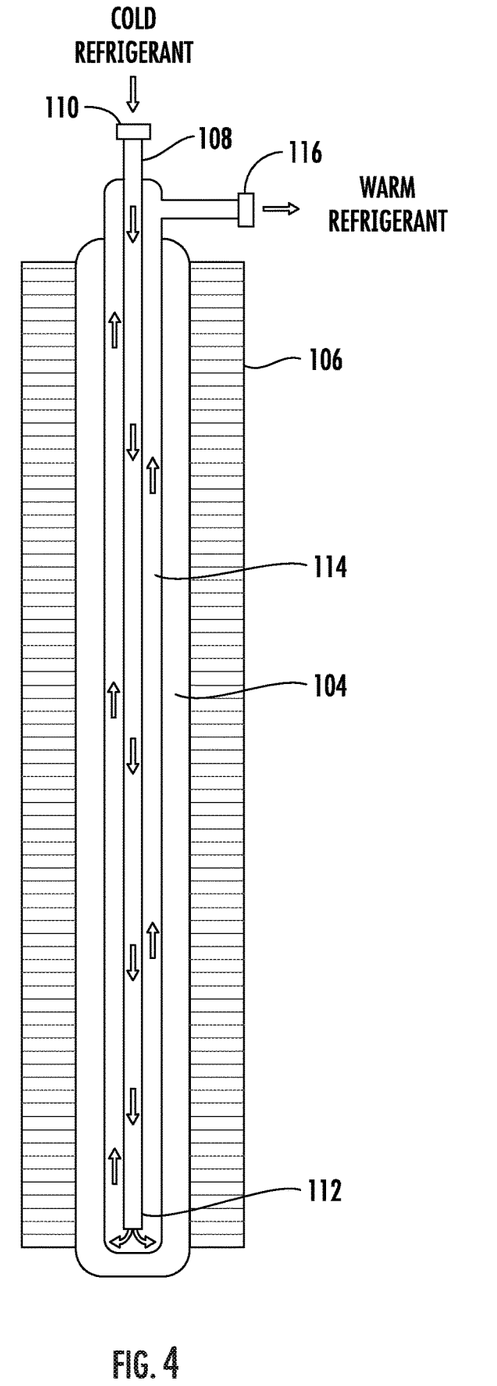
FIG. 4 is a schematic of flow of refrigerant through the geothermal adapter of FIG. 1 during a heat cycle.

Referring now to FIG. 4, a thermal profile of the geothermal adapter is depicted as the cold liquid refrigerant flows in through a top conduit and into the inner chamber of the geothermal adapter. The cold refrigerant begins to absorb geothermal heat as it flows to the bottom of the inner chamber. After flowing out of the inner chamber it flows into the center chamber at which time the volume of liquid increases but the flow rate decreases, this process allows the cool liquid refrigerant to absorb more geothermal heat from the outer chamber. The liquid refrigerant, which has now absorbed geothermal heat, then flows back through a discharge conduit to the heat pump. The discharge conduit is approximately the same size as the inlet conduit and the flow rate remains relatively constant as the refrigerant circulates between the heat pump and the geothermal adapter.

FIG. 4 illustrates the advantage of the geothermal adapter as the temperature of the refrigerant returning to the outdoor section is subfreezing. The refrigerant enters the geothermal adapter, flows down into the inner chamber, then slowly upwards absorbing the geothermal heat until it flows back into the insulated liquid line, it has absorbed all the rich geothermal energy it could absorb before reaching the outdoor section. This geothermal energy was supplied free of monetary expense from the earth to heat a house or building.

Figure 5:
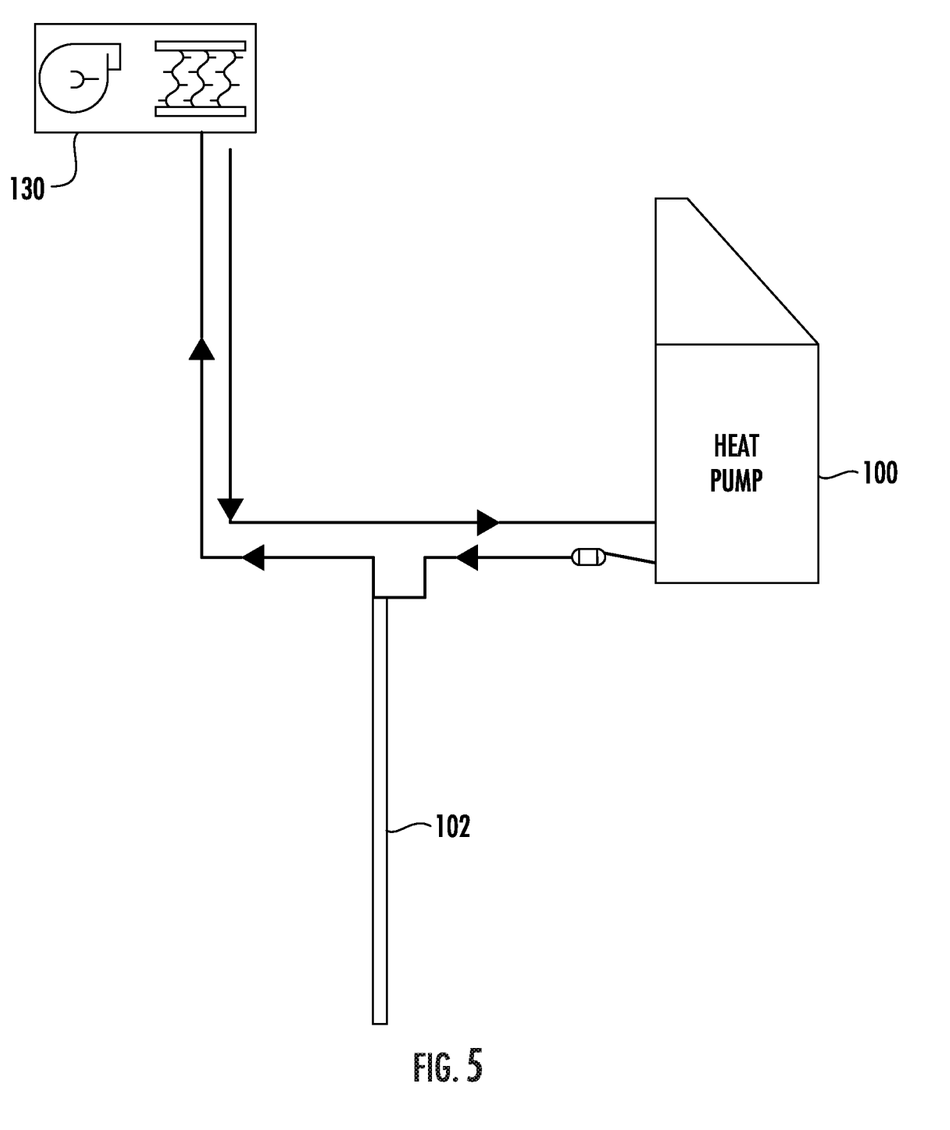
FIG. 5 is schematic of the flow of refrigerant between a heat pump, the geothermal adapter, and air handler during a cooling cycle.

The directional flow of the refrigerant in the cooling cycle of a heat pump 100 is shown in FIG. 5, which is from the air handler 130, to the heat pump 100, to the geothermal adapter 102, and back to the air handler 130. This flow direction would be reversed in the heating cycle discussed below with reference to FIG. 6. The geothermal adapter 102 is used to release the heat of the refrigerant into the earth instead of the refrigerant absorbing geothermal energy as in the heating cycle.

Figure 6:
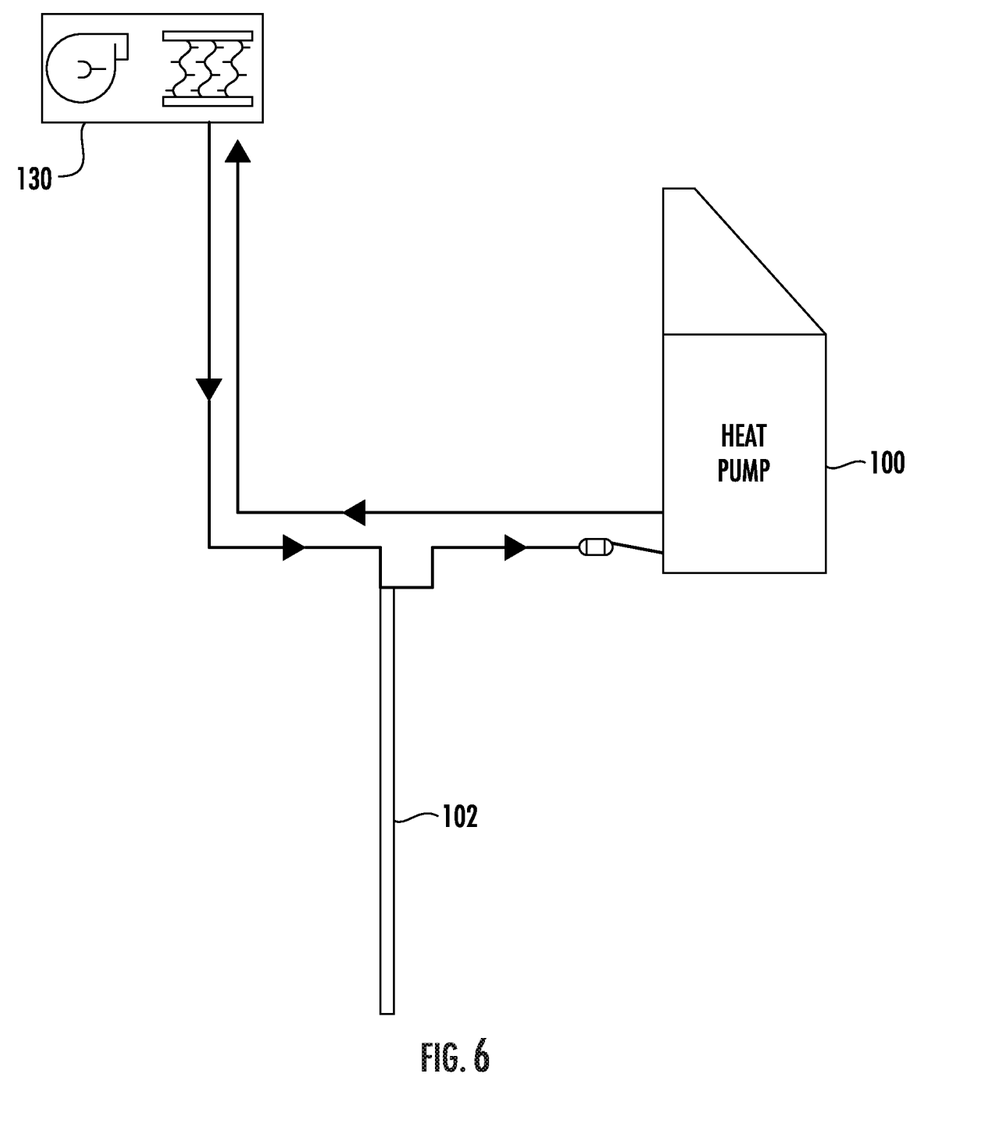
FIG. 6 is schematic of the flow of refrigerant between a heat pump, the geothermal adapter, and air handler during a heating cycle.

Referring now to FIG. 6, the directional flow of the refrigerant in the heating cycle of a heat pump 100 is shown in contrast of the flow direction when in the cooling cycle as shown in FIG. 5. As explained above, the geothermal adapter 102 is used to tap into geothermal energy from below the earth so that the direction of flow of the refrigerant is from the air handler 130, to the geothermal adapter 102, to the heat pump 100, and back to the air handler 130. Accordingly, the geothermal adapter 102 helps to reduce negative effects of a typical air to air source heat pump cycle and will significantly increase the efficiency of the heat pump 100 under extreme cold conditions. This is due in part to reducing the need for defrost cycles of the heat pump 100 during a heat cycle, which causes significant efficiency loss. Thus, the geothermal adapter 102 is configured to significantly increase the ability to use heat pump technology even in geographic areas that have cold climates. In addition, the geothermal adapter 102 will significantly reduce the emissions of fossil fuels by furnaces and oil burners, which were previously the only practical method of heating in these cold climates.

The geothermal adapter 102 is suitable to be used in locations once thought impossible to tap the benefits of geothermal heat energy because of the large amount of area required by typical geothermal systems. The geothermal adapter 102 in accordance with the invention needs about one-foot square area for installation so that practically any home or building can implement the geothermal adapter 102. In particular, even structures in urban areas, condos, townhouse, small lots, even city dwellings, can implement the geothermal adapter for use with the heat pump.

Additional features and advantages to the geothermal adapter 102 include, but are not limited to, once below the surface even the upper portions of the geothermal adapter 102 will be absorbing heat from the ground. The moisture and soil acts as an insulator similar to snow against the severe cold conditions of the air temperature. Moisture released below the surface 118 works with the properties of the zeolite 120 to enhance performance of the geothermal adapter 120. This is in contrast to a conventional heat pump system where the heat pump uses only the ambient air temperature to operate, and the efficiency of the heat pump is impacted significantly when the ambient air is at or below freezing.

As explained above, the preferred installation is to insert the geothermal adapter 102 into a bored hole about twelve feet deep and six inches in diameter with the hole filled to the ground surface level with zeolite 120. The dimensions of the installation are sufficient to accommodate approximately nine percent expansion and movement of the ground during natural freeze and defrost cycles in which the ground will expand and move.

Figure 7:
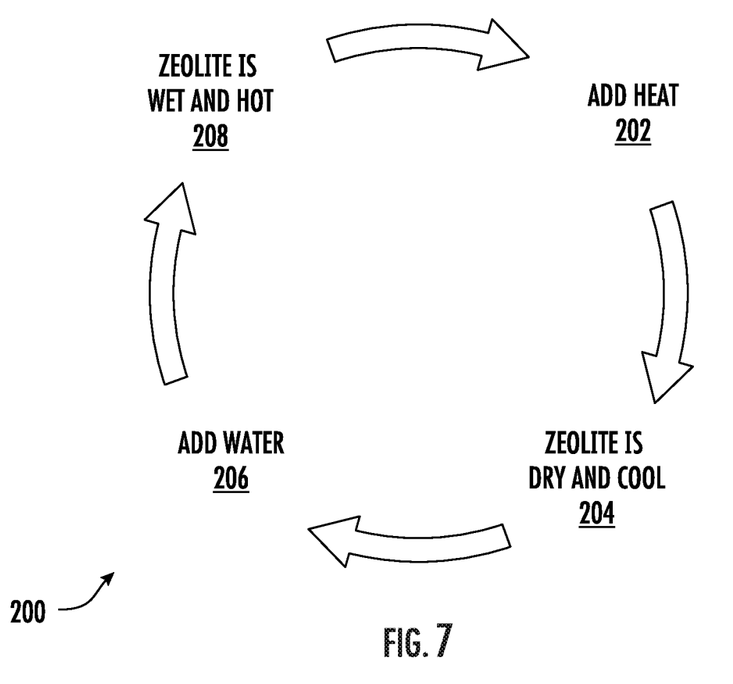
FIG. 7 is a chart of the thermal absorption and storage cycle of zeolite as a mineral.

Referring now to FIG. 7, the thermal absorption and storage cycle of the properties of zeolite as a mineral is illustrated and generally designated 200. Zeolite comprises physical properties that are exploited by the geothermal adapter to efficiently transfer the natural geothermal energy of the earth to the refrigerant. In particular, zeolite acts as a mineral sponge to store up to four times more heat than water because zeolite has the ability to absorb water and absorbing water produces heat in the form of steam. Zeolite is durable and is a naturally occurring mineral. Accordingly, at 202, when heat is added, zeolite is dry and cool, at 204. Then water is added, at 206, and the zeolite becomes wet and hot, at 208, and the cycle repeats.

When refrigerant is flowing through the copper inner chamber 114 and center chamber 108 and the plurality of aluminum heat sinks 106 are in contact with the zeolite 120 which is at approximately fifty-five degrees due to the geothermal heat of the earth, the plurality of heat sinks 106 and copper will begin to form condensation deep below the surface, even on the coldest days. This condensation will flow as water into and react with the zeolite 120. This reaction in return releases heat to be absorbed by the liquid refrigerant further increasing the efficiency of the refrigerant and ability to perform thermal transfer in even the most challenging conditions.

The refrigerant returns rich in thermal energy from the geothermal adapter 102 instead of attempting to absorb heat from the coldest outdoor conditions by utilizing and absorbing heat from the earth. Accordingly, regardless to how cold the outdoor air may be, the temperature below ground will remain around fifty-five degrees Fahrenheit. The heat pump 100 can operate at maximum efficiency regardless of the outdoor temperatures or conditions when using the geothermal adapter 102. Thus, heat pump systems with the geothermal adapter 102 can be installed in some of the coldest locations on earth and will remain at maximum efficiency because the geothermal adapter 102 has no moving parts and is reliable.

A method of operating a heating and cooling system that utilizes the geothermal adapter described above includes circulating refrigerant between the heat pump 100, the air handler 130, and the geothermal adapter 102. The flow direction of the refrigerant during a heating cycle is from the heat pump 100 to the air handler 130, to the geothermal adapter 102, and back to the heat pump 100. During a cooling cycle, the flow direction of the refrigerant is from the heat pump 100 to the geothermal adapter 102, to the air handler 130, and back to the heat pump 100.

The geothermal adapter 102 reduces the defrost cycles required by the heat pump 100 and accentuates the positive aspects of the operation of a heat pump 100 while reducing the negative aspects. In addition, since the installation of the geothermal adapter 102 requires a relatively small shallow hole, it is cost effective to install and can be utilized in residential, commercial and industrial settings, regardless of location or soil.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A geothermal adapter for use with a heat pump, the geothermal adapter comprising:
    an outer chamber being sealed under vacuum and having a plurality of heat sinks extending outward;
    an inner chamber positioned concentrically and within the outer chamber, the inner chamber having an outlet configured to be coupled to a first portion of a refrigerant conduit of the heat pump; and
    a central chamber positioned concentrically and within the inner chamber, the central chamber having an inlet configured to be coupled to a second portion of the refrigerant conduit of the heat pump;
    wherein the center chamber extends through the inner chamber to a bottom end that is open and in fluid communication with the inner chamber.

2. The geothermal adapter of claim 1, wherein the outer chamber comprises copper.

3. The geothermal adapter of claim 2, wherein the inner and central chambers comprise copper.

4. The geothermal adapter of claim 3, wherein the plurality of heat sinks comprise aluminum.

5. The geothermal adapter of claim 1, wherein a length of the geothermal adapter is approximately twelve feet.

6. The geothermal adapter of claim 5, wherein a width of the geothermal adapter is approximately five inches.

7. The geothermal adapter of claim 1, further comprising zeolite surrounding the plurality of heat sinks.

8. The geothermal adapter of claim 1, wherein the geothermal adapter is configured to receive refrigerant at a first temperature at the inlet of the central chamber during a heating cycle, and to discharge the refrigerant at a second temperature higher than the first temperature at the outlet of the inner chamber.

9. The geothermal adapter of claim 1, wherein the geothermal adapter is configured to receive refrigerant at a first temperature at an inlet of the inner chamber during a cooling cycle, and to discharge the refrigerant at a second temperature lower than the first temperature at an outlet of the central chamber.

10. The geothermal adapter of claim 1, wherein the outer, inner, and central chambers comprise ACR or L type copper.

11. A heating and cooling system, the system comprising:
    a heat pump;
    an air handler;
    a geothermal adapter coupled between the heat pump and the air handler and positioned below ground, the geothermal adapter comprising,
        an outer chamber being sealed under vacuum and having a plurality of heat sinks extending outward;
        an inner chamber positioned concentrically and within the outer chamber, the inner chamber having an outlet configured to be coupled to a first portion of a refrigerant conduit of the heat pump; and
        a central chamber positioned concentrically and within the inner chamber, the central chamber having an inlet configured to be coupled to a second portion of the refrigerant conduit of the heat pump;
        wherein the center chamber extends through the inner chamber to a bottom end that is open and in fluid communication with the inner chamber.

12. The system of claim 11, wherein the outer chamber comprises copper.

13. The system of claim 12, wherein the inner and central chambers comprise copper.

14. The system of claim 13, wherein the plurality of heat sinks comprise aluminum.

15. The system of claim 11, wherein a length of the geothermal adapter is approximately twelve feet.

16. The system of claim 15, wherein a width of the geothermal adapter is approximately five inches.

17. The system of claim 11, further comprising zeolite surrounding the plurality of heat sinks.

18. A method of operating a heating and cooling system comprising a heat pump, an air handler, and a geothermal adapter coupled between the heat pump and the air handler and positioned below ground, the geothermal adapter comprising an outer chamber being sealed under vacuum and having a plurality of heat sinks extending outward, an inner chamber positioned concentrically and within the outer chamber, and a central chamber positioned concentrically and within the inner chamber, wherein the center chamber extends through the inner chamber to a bottom end that is open and in fluid communication with the inner chamber, the method comprising:

circulating refrigerant between the heat pump, the air handler, and the geothermal adapter.

19. The method of claim 18, wherein a flow direction of the refrigerant during a heating cycle is from the heat pump to the air handler, to the geothermal adapter, and back to the heat pump.

20. The method of claim 18, wherein a flow direction of the refrigerant during a cooling cycle is from the heat pump to the geothermal adapter, to the air handler, and back to the heat pump.

\* \* \* \* \*